United States Patent
Que

(10) Patent No.: US 10,802,204 B2
(45) Date of Patent: Oct. 13, 2020

(54) LIGHT GUIDE PLATE AND BACKLIGHT MODULE COMPRISING THE LIGHT GUIDE PLATE

(71) Applicant: Shenzhen China Star Optoelectronics Technology Co., Ltd., Shenzhen, Guangdong (CN)

(72) Inventor: Chengwen Que, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 404 days.

(21) Appl. No.: 15/565,452

(22) PCT Filed: Jul. 13, 2017

(86) PCT No.: PCT/CN2017/092691
§ 371 (c)(1),
(2) Date: Jul. 31, 2018

(87) PCT Pub. No.: WO2018/232794
PCT Pub. Date: Dec. 27, 2018

(65) Prior Publication Data
US 2019/0383991 A1 Dec. 19, 2019

(30) Foreign Application Priority Data

Jun. 19, 2017 (CN) .......................... 2017 1 0467985

(51) Int. Cl.
*F21V 8/00* (2006.01)
(52) U.S. Cl.
CPC ......... *G02B 6/0078* (2013.01); *G02B 6/0026* (2013.01); *G02B 6/0068* (2013.01); *G02B 6/0065* (2013.01)

(58) Field of Classification Search
CPC .. G02B 6/0078; G02B 6/0026; G02B 6/0068; G02B 6/0065; G02B 6/005;
(Continued)

(56) References Cited

U.S. PATENT DOCUMENTS

2013/0294107 A1* 11/2013 Ohkawa ............ G02F 1/133615
362/606
2015/0219940 A1 8/2015 Kim et al.
(Continued)

FOREIGN PATENT DOCUMENTS

CN 203433140 U 2/2014
CN 203433141 U 2/2014
(Continued)

OTHER PUBLICATIONS

International Search Report dated Mar. 16, 2018 for International Patent Application No. PCT/CN2017/092691.
(Continued)

*Primary Examiner* — Cara E Rakowski
*Assistant Examiner* — Jessica M Apenteng

(57) ABSTRACT

Disclosed are a light guide plate and a backlight module including the light guide plate. The light guide plate includes multiple light guide plate segments, each of which is linear, and the multiple light guide plate segments are connected with each other successively to form an entire light guide plate. The entire light guide plate extends in a curved shape along a length direction thereof, and the entire light guide plate includes a light exiting surface and a light entering surface which is arranged at a side of the light exiting surface. The backlight module includes a light source, a plurality of quantum dot glass tubes which are connected with each other successively, and a light guide plate. The light source and the light entering surface of the light guide plate are arranged corresponding to each other, and each of
(Continued)

the quantum dot glass tubes is arranged between the light source and a light guide plate segment correspondingly. By means of the light guide plate and the backlight module including the light guide plate, light coupling efficiency of the light guide plate and the quantum dot glass tubes can be improved, and an application range of the quantum dot glass tubes can be enlarged.

7 Claims, 2 Drawing Sheets

(58) Field of Classification Search
CPC .. G02B 6/0076; G02B 6/0172; G02B 6/0031; G02B 6/00; G02B 6/0073; G02B 6/0091
USPC .................................................. 362/60–634
See application file for complete search history.

(56) References Cited

U.S. PATENT DOCUMENTS

| 2016/0282540 A1* | 9/2016 | Wang | G02B 6/0051 |
| 2016/0377788 A1* | 12/2016 | Que | G02B 6/0016 |
| | | | 349/65 |

FOREIGN PATENT DOCUMENTS

| CN | 203773876 U | 8/2014 |
| CN | 104090425 A | 10/2014 |
| CN | 205015588 U | 2/2016 |

OTHER PUBLICATIONS

Chinese Office Action dated May 14, 2018 for Chinese Patent Application No. 201710467985.2.

\* cited by examiner

LIGHT GUIDE PLATE AND BACKLIGHT MODULE COMPRISING THE LIGHT GUIDE PLATE

CROSS-REFERENCE TO RELATED APPLICATIONS

This application claims the priority of Chinese patent application CN201710467985.2, entitled "Light guide plate and backlight module comprising the light guide plate" and filed on Jun. 19, 2017, the entirety of which is incorporated herein by reference.

FIELD OF THE INVENTION

The present disclosure relates to the technical field of liquid crystal display, and in particular, to a light guide plate and a backlight module comprising the light guide plate.

BACKGROUND OF THE INVENTION

A liquid crystal display (LCD) device has many advantages, such as high definition, small volume, light weight, low driving voltage, low power consumption and so on, and thus it is widely applied to consumer communication or electronic products, such as personal digital assistants (PDA), mobile phones, camcorders, and projection televisions. With increasing competition in the television industry, many liquid crystal television producers have produced distinct high-end products so as to enhance product competitiveness and marketing effects and further get high profits. Moreover, since applications of quantum dot technologies to liquid crystal display devices can greatly improve a display index, improve display color gamut, provide excellent product definition, and can improve marketing competetiveness of products, development and application of curved-surface quantum dot technologies are very important. Besides, since quantum dots can easily react with water or oxygen in air and thereby fail to work, waterproof and oxygen-insulating encapsulations should be performed to quantum dots before use thereof. It is common to use quantum dot tubes to perform encapsulations. In the prior art, the quantum dot tubes are made by encapsulating quantum dots in tubular vessels made from glass. However, since glass tubular vessels cannot be bent, quantum dot glass tubes cannot be widely applied to curved-surface televisions.

SUMMARY OF THE INVENTION

With respect to the above problem, the present disclosure aims to provide a light guide plate and a backlight module comprising the light guide plate. The light guide plate comprises multiple light guide plate segments which are connected with each other successively to form an entire light guide plate. The entire light guide plate extends in a curved shape along a length direction thereof. Actual light exiting requirements can be met by adjusting light exiting trends, in the backlight module, a light source and a light entering surface of the light guide plate are arranged correspondingly to each other. Each quantum glass tube is arranged between the light source and a light guide plate segment. In this manner, light coupling efficiency of the light guide plate and quantum dot glass tubes can be improved, and an application range of the quantum dot glass tubes can be enlarged.

In order to achieve the above aim, the present disclosure provides a light guide plate. The light guide plate comprises multiple light guide plate segments, each of which is linear, and the multiple light guide plate segments are connected with each other successively to form an entire light guide plate. The entire light guide plate extends in a curved shape along a length direction thereof, and the entire light guide plate comprises a light exiting surface and a light entering surface which is arranged at a side of the light exiting surface.

The light exiting surface is arranged on a top surface of the entire light guide plate, and the light entering surface is arranged at a lateral surface of the entire light guide plate. The light entering surface is arranged along a length direction of the entire light guide plate.

The entire light guide plate is formed by jointing the multiple light guide plate segments, and the multiple light guide plate segments are formed by performing a heat press molding to the entire light guide plate by a mould.

An angle between two adjacent light guide plate segments is an obtuse angle, and a curvature of the entire light guide plate is adjusted by adjusting the angle between two adjacent light guide plate segments.

The entire light guide plate is made of polymethyl methacrylate or copolymer of methyl methacrylate and styrene.

The backlight module further provides a backlight module. The backlight module comprises a light source, a plurality of quantum dot glass tubes which are connected with each other successively, and a light guide plate. The light guide plate comprises multiple light guide plate segments, each of which is linear, and the multiple light guide plate segments are connected with each other successively to form an entire light guide plate. The entire light guide plate extends in a curved shape along a length direction thereof, and the entire light guide plate comprises a light exiting surface and a light entering surface which is arranged at a side of the light exiting surface. The light source and the light entering surface of the light guide plate are arranged corresponding to each other, and each of the quantum dot glass tubes is arranged between the light source and a light guide plate segment correspondingly.

The light source comprises a plurality of light bars which are jointed successively. Each light bar is arranged parallel to a quantum dot glass tube, and each quantum dot glass tube is arranged parallel to a light guide plate segment. Each light bar is provided with a plurality of light emitting diode light beads which are spaced from one another, face the quantum dot glass tubes, and emit in a monochrome waveband.

Respective quantum dot glass tubes are jointed with each other successively.

Each of the quantum dot glass tubes is a linear quantum dot glass tube.

A cross section of each of the quantum dot glass tubes is oval.

The present disclosure has following advantages. 1. The light guide plate of the present disclosure comprises multiple light guide plate segments which are connected with each other successively to form an entire light guide plate. The entire light guide plate extends in a curved shape along a length direction thereof. Actual light exiting requirements can be met by adjusting light exiting trends. The light guide plate has a simple structure, and is convenient to use.

2. The light guide plate in the present disclosure is provided with a light entering surface which is arranged along a length direction of the entire light guide plate. When the entire light guide plate expands or contracts due to temperature change, since the light entering surface moves for a relatively short distance, a buffer distance between the light entering surface and the light source can be shortened, and light coupling efficiency thereof can be improved.

3. An angle between two adjacent light guide plate segments is an obtuse angle, and a curvature of the entire light guide plate can be adjusted by adjusting the angle between two adjacent light guide plate segments so as to meet requirements for light entering and light exiting. Therefore, when the entire light guide plate is applied to a backlight module or a lamp, a better light coupling effect can be obtained.

4. The backlight module in the present disclosure is provided with a light guide plate. The light entering surface of the light guide plate is arranged along a length direction of the entire light guide plate. When the entire light guide plate expands or contracts due to temperature change, since the light entering surface moves for a relatively short distance, a buffer distance between the light entering surface and each quantum dot glass tube can be shortened, and thus light coupling efficiency thereof can be improved.

5. The backlight module is provided with a light guide plate. A curvature of the light guide plate can be adjusted by adjusting an angle between two adjacent light guide plate segments. Therefore, light entering and light exiting requirements can be met, and a better coupling effect can be obtained.

6. The backlight module is provided with a plurality of quantum dot glass tubes. Through corresponding arrangements of respective quantum dot glass tubes and respective light guide plate segments, light coupling efficiency of respective quantum dot glass tubes can be improved, and uniformity of light irradiated on the light entering surface can be improved.

7. The backlight module is provided with a plurality of quantum dot glass tubes, and quantum dot materials are arranged within each quantum dot glass tube. The quantum dot materials have advantages such as tunable light emitting wavelength, high fluorescence quantum efficiency, small particle size, high color saturation, and high stability.

8. The backlight module is provided with a light source. The light source comprises a plurality of light bars which are jointed successively. Each light bar is arranged parallel to a quantum dot glass tube. Each light bar is provided with a plurality of light emitting diode light beads which are spaced from one another, face the quantum dot glass tubes, and emit in a monochrome waveband. Therefore, light coupling efficiency of respective quantum dot glass tubes can be further improved, thereby improving light concentration degree on the light entering surface.

Other features and advantages of the present disclosure will be further explained in the following description, and will partly become self-evident therefrom, or be understood through the implementation of the present disclosure. The objectives and other advantages of the present disclosure will be achieved through the structures specifically pointed out in the description, claims, and the accompanying drawings.

BRIEF DESCRIPTION OF THE DRAWINGS

The present disclosure will be described in a more detailed way below based on embodiments and with reference to the accompanying drawings. In the drawings.

DETAILED DESCRIPTION OF THE EMBODIMENTS

The present disclosure will be explained in detail below with reference to the accompanying drawings.

Figure 1:
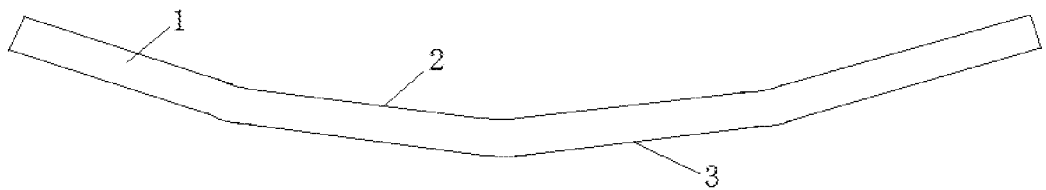
FIG. 1 schematically shows a structure of a light guide plate in the present disclosure.

As shown in FIG. 1, a light guide plate provided in the present disclosure comprises multiple light guide plate segments 1. Each light guide plate segment 1 is linear. Multiple light guide plate segments 1 are connected with each other successively to form an entire light guide plate. The entire light guide plate extends in a curved shape along a length direction thereof, and actual light exiting requirements can be met. The entire light guide plate comprises a light exiting surface 2 and a light entering surface 3 which is arranged at a side of the light exiting surface 2.

Figure 2:
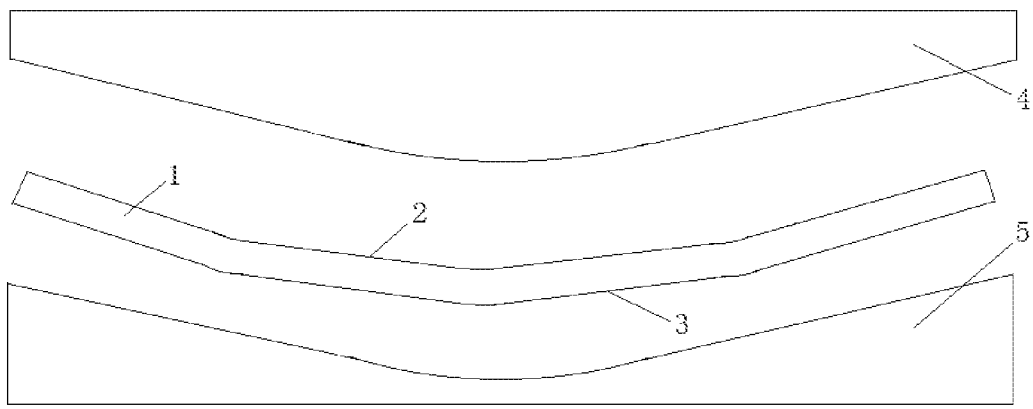
FIG. 2 schematically shows a structure of the light guide plate in the present disclosure in use.

In the above embodiment, the light exiting surface 2 is arranged on a top surface of the entire light guide plate as shown in FIG. 2, the light exiting surface 2 is arranged on a surface of the entire light guide plate close to a first mold plate 4), and the light entering surface 3 is arranged on a lateral surface of the entire light guide plate. The light entering surface 3 is arranged along a length direction of the entire light guide plate. When the entire light guide plate expands or contracts due to temperature change, since the light entering surface 3 moves for a relatively short distance, a buffer distance between the light entering surface 3 and a light source can be shortened, thereby improving light coupling efficiency thereof.

In the above embodiment, the entire light guide plate is formed by jointing multiple light guide plate segments 1.

In the above embodiment, the multiple light guide plate segments 1 are formed by performing a heat press molding to the entire light guide plate by a mould.

In the above embodiment, an angle between two adjacent light guide plate segments 1 is an obtuse angle. A curvature of the entire light guide plate can be adjusted by adjusting the angle between two adjacent light guide plate segments 1. The angle between two adjacent light guide plate segments 1 can be adjusted according to shapes of the first mold plate 4 and a second mold plate 5 (as shown in FIG. 2) so as to meet light entering and light exiting requirements. When the entire light guide plate is applied to a backlight module or a lamp, a better light coupling effect can be obtained.

In the above embodiment, the entire light guide plate is made of PMMA (polymethyl methacrylate) or MS (copolymer of methyl methacrylate and styrene).

As shown in FIG. 2, when the light guide plate of the present disclosure is used, the entire light guide plate should be placed between the first mold plate 4 and the second mold plate 5. Meanwhile, the angle between two adjacent light guide plate segments 1 can be adjusted according to shapes of the first mold plate 4 and the second mold plate 5 so as to meet light entering and light exiting requirements.

Figure 3:
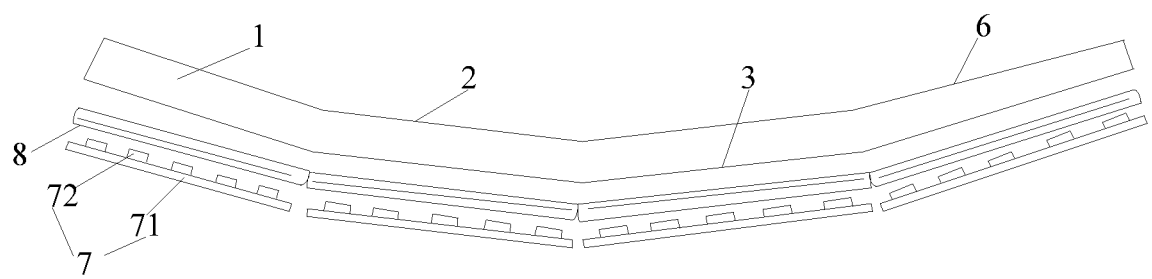
FIG. 3 schematically shows a structure of a backlight module in the present disclosure.

As shown in FIG. 3, a backlight module provided in the present disclosure comprises a light guide plate 6, a light source 7, and a plurality of quantum dot glass tubes 8 which are connected with each other successively. The light guide plate 6 comprises multiple light guide plate segments 1 which are connected with each other successively. The light guide plate 6 extends in a curved shape along a length direction thereof, and actual light exiting requirements can be met. The light guide plate 6 comprises a light exiting surface 2 and a light entering surface 3 which is arranged at a side of the light exiting surface 2. The light source 7 and the light entering surface 3 are arranged corresponding to each other. Each quantum dot glass tube 8 is arranged between the light source 7 and a light guide plate segment 1. Through corresponding arrangements between respective quantum dot glass tubes 8 and respective light guide plate segments 1, light coupling efficiency of respective quantum dot glass tubes 8 can be improved, and uniformity of light irradiated on the light entering surface 3 can be improved.

In the above embodiment, the light source 7 comprises a plurality of successively jointed light bars 71 (as shown in FIG. 3, a plurality of light bars are spaced from one another, which illustrates that each light bar 71 is independent), and each light bar 71 is arranged parallel to a quantum dot glass tube 8. Meanwhile, each quantum dot glass tube 8 is arranged parallel to a light guide plate segment 1 so as to improve light coupling efficiency of the quantum dot glass tube 8 and improve uniformity of light irradiated on the light entering surface 3. Each light bar 71 is provided with a plurality of LED (light emitting diode) light beads 72 which are spaced from one another, face the quantum dot glass tubes 8, and emit in a monochrome waveband. Therefore, light coupling efficiency of respective quantum dot glass tubes 8 can be further improved, thereby improving light concentration degree on the light entering surface 3.

In the above embodiment, the light exiting surface 2 is arranged on a top surface of the light guide plate 6, and the light entering surface 3 is arranged on a lateral surface of the light guide plate 6. The light entering surface 3 is arranged along a length direction of the light guide plate 6. When the entire light guide plate expands or contracts due to temperature change, since the light entering surface 3 moves for a relatively short distance, a buffer distance between the light entering surface 3 and each quantum dot glass tube 8 and the light source 7 can be shortened, thereby improving light coupling efficiency thereof.

In the above embodiment, the light guide plate 6 is formed by jointing multiple light guide plate segments 1. Respective quantum dot glass tubes 8 are jointed with each other successively.

In the above embodiment, an angle between two adjacent light guide plate segments 1 is an obtuse angle. A curvature of the light guide plate 6 can be adjusted by adjusting the angle between two adjacent light guide plate segments 1. The angle between two adjacent light guide plate segments 1 can be adjusted according to shapes of a first mold plate 4 and a second mold plate 5 (as shown in FIG. 2) so as to meet light exiting requirements and obtain a better light coupling effect.

In the above embodiment, the multiple light guide plate segments 1 are formed by performing a heat press molding to the light guide plate 6 by a mould.

In the above embodiment, the light guide plate 6 is made of PMMA (polymethyl methacrylate) or MS (copolymer of methyl methacrylate and styrene).

In the above embodiment, quantum dot materials are arranged within each quantum dot glass tube 8. The quantum dot materials have advantages such as tunable light emitting wavelength, high fluorescence quantum efficiency, small particle size, high color saturation, and high stability.

In the above embodiment, each quantum dot glass tube 8 is linear, and a cross section of each quantum dot glass tube 8 is oval.

As shown in FIG. 3, when the backlight module of the present disclosure is used, monochrome waveband light emitted by light emitting diode light beads 72 of each light bar 71 in the light source 7 irradiates on a corresponding quantum dot glass tube 8. By an action of the quantum dot materials within each quantum dot glass tube 8, white light can be formed by blending according to photoluminescence principles. The white light irradiates on the light entering surface 3 of the light guide plate 6, and then exits via the light exiting surface 2 of the light guide plate 6.

Although the embodiments are disclosed as above, the embodiments are described only for better understanding, rather than restricting the present disclosure. Anyone skilled in the art can make amendments to the implementing forms or details without departing from the spirit and scope of the present disclosure. The scope of the present disclosure should be subject to the scope defined in the claims.

The invention claimed is:

1. A backlight module, wherein the backlight module comprises a light source, a plurality of quantum dot glass tubes which are connected with each other successively, and a light guide plate, wherein the light guide plate comprises multiple light guide plate segments, each of which is linear, and the multiple light guide plate segments are connected with each other successively to form an entire light guide plate, wherein the entire light guide plate extends in a curved shape along a length direction thereof and the entire light guide plate comprises a light exiting surface and a light entering surface which is arranged at an opposing side of the light exiting surface, and wherein the light source and the light entering surface of the light guide plate are arranged corresponding to each other, each of the quantum dot glass tubes is arranged between the light source and a light guide plate segment correspondingly, and each light guide plate segment corresponds to one quantum dot glass tube.

2. The backlight module according to claim 1, wherein the light source comprises a plurality of light bars which are jointed successively, wherein each light bar is arranged parallel to a quantum dot glass tube, and each quantum dot glass tube is arranged parallel to a light guide plate segment; and wherein each light bar is provided with a plurality of light emitting diode light beads which are spaced from one another, face the quantum dot glass tubes, and emit light in a monochrome waveband.

3. The backlight module according to claim 1, wherein respective quantum dot glass tubes are jointed with each other successively.

4. The backlight module according to claim 2, wherein respective quantum dot glass tubes are jointed with each other successively.

5. The backlight module according to claim 1, wherein each of the quantum dot glass tubes is a linear quantum dot glass tube.

6. The backlight module according to claim 1, wherein a cross section of each of the quantum dot glass tubes is oval.

7. The backlight module according to claim 5, wherein a cross section of each of the quantum dot glass tubes is oval.

* * * * *